(12) United States Patent
Lee et al.

(10) Patent No.: US 11,820,190 B2
(45) Date of Patent: Nov. 21, 2023

(54) COUPLED TORSION BEAM AXLE TYPE REAR SUSPENSION SYSTEM

(71) Applicants: HYUNDAI MOTOR COMPANY, Seoul (KR); KIA CORPORATION, Seoul (KR)

(72) Inventors: Seung Hak Lee, Asan-si (KR); Won Hae Lee, Seoul (KR); Byung Joo Chung, Gunpo-si (KR); Nam Ho Kim, Gwangmyeong-si (KR); Min Seok Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/970,679

(22) Filed: Oct. 21, 2022

(65) Prior Publication Data

US 2023/0339282 A1    Oct. 26, 2023

(30) Foreign Application Priority Data

Apr. 25, 2022  (KR) .......................... 10-2022-0050714

(51) Int. Cl.
  *B60G 21/05*    (2006.01)
  *B60G 7/02*     (2006.01)
(52) U.S. Cl.
  CPC ............. *B60G 21/051* (2013.01); *B60G 7/02* (2013.01); *B60G 2202/114* (2013.01); *B60G 2202/136* (2013.01); *B60G 2204/121* (2013.01); *B60G 2204/122* (2013.01)
(58) Field of Classification Search
  CPC ........................ B60G 2204/121; B60G 21/051
  See application file for complete search history.

(56) References Cited

U.S. PATENT DOCUMENTS

| 8,632,078 | B2 | 1/2014 | Ehrlich et al. |
| 9,162,546 | B2 * | 10/2015 | Girelli Consolaro ........................ B60G 21/0551 |
| 11,298,999 | B2 * | 4/2022 | Oh ........................... B60G 9/02 |
| 2014/0353937 | A1 * | 12/2014 | Girelli Consolaro .... B60G 3/20 280/124.128 |

(Continued)

FOREIGN PATENT DOCUMENTS

| CN | 207902072 U | * | 9/2018 |
| CN | 109484116 A | * | 3/2019 |
| CN | 109484117 A | * | 3/2019 |

(Continued)

OTHER PUBLICATIONS

CN 109484119 A machine translation from espacenet.com March (Year: 2023).*

*Primary Examiner* — Paul N Dickson
*Assistant Examiner* — Maxwell L Meshaka
(74) *Attorney, Agent, or Firm* — LEMPIA SUMMERFIELD KATZ LLC

(57) ABSTRACT

Disclosed herein is a coupled torsion beam axle type rear suspension system that includes a coupled torsion beam axle (100) installed to extend in a transverse direction of a vehicle body, a pair of trailing arms (200) coupled to respective ends of the coupled torsion beam axle (100), and a transverse leaf spring (300) having both ends connected to the respective trailing arms (200) and a center portion connected to a body cross member (40), thereby reducing the number of parts and improving driving stability.

11 Claims, 5 Drawing Sheets

(56) References Cited

U.S. PATENT DOCUMENTS

2020/0282785 A1\* 9/2020 Oh .......................... B60G 9/02

FOREIGN PATENT DOCUMENTS

| | | | | |
|---|---|---|---|---|
| CN | 109484118 | A | \* | 3/2019 |
| CN | 109484119 | A | | 3/2019 |
| CN | 109484119 | B | \* | 12/2020 |
| EP | 3241693 | A1 | \* | 11/2017 |
| JP | H0635706 | Y2 | | 9/1994 |
| JP | 2727771 | B2 | | 12/1997 |
| JP | 6074319 | B2 | | 1/2017 |
| JP | 6210734 | B2 | | 9/2017 |
| JP | 6236223 | B2 | | 11/2017 |
| KR | 20120057143 | A | | 6/2012 |
| KR | 20180066540 | A | | 6/2018 |
| WO | WO-2022069287 | A1 | \* | 4/2022 |

\* cited by examiner

FIG. 6 "PRIOR ART"
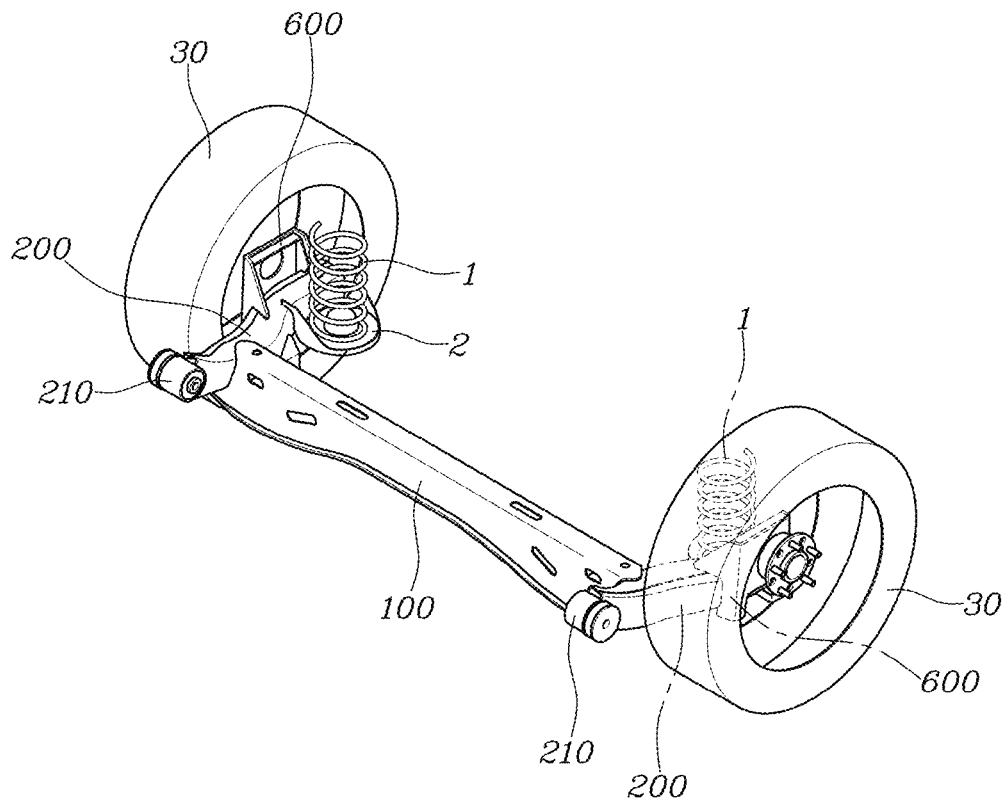
FIG. 7 "PRIOR ART"
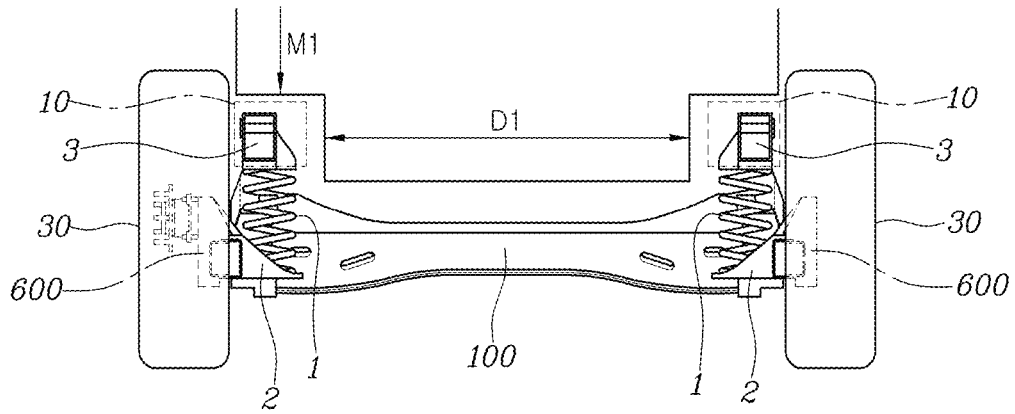

FIG. 8 "PRIOR ART"
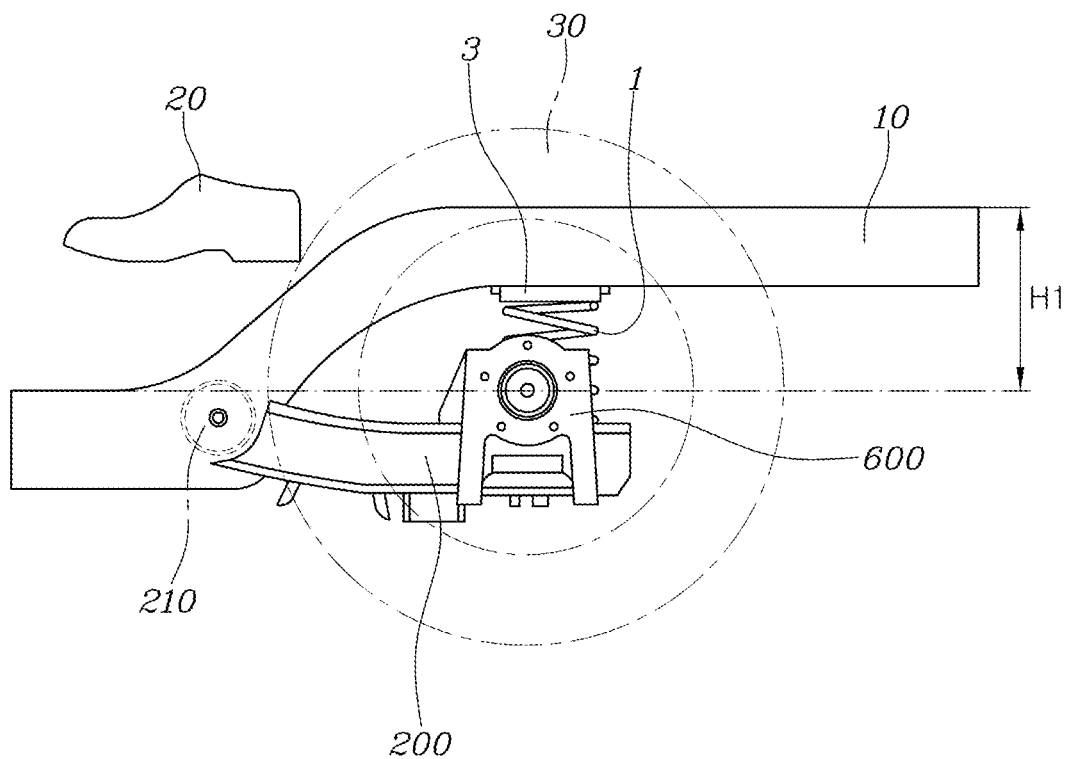
FIG. 9 "PRIOR ART"
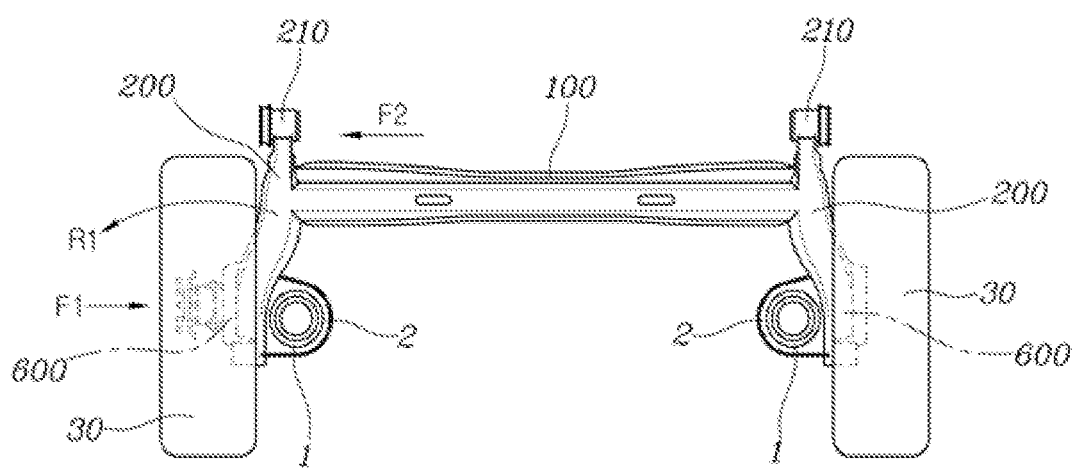

COUPLED TORSION BEAM AXLE TYPE REAR SUSPENSION SYSTEM

CROSS REFERENCE TO RELATED APPLICATION

The present application claims priority to and the benefit of Korean Patent Application No. 10-2022-0050714 filed on Apr. 25, 2022, the entire contents of which are incorporated herein by reference.

BACKGROUND

Technical Field

The present disclosure relates to a coupled torsion beam axle type rear suspension system, and more particularly, to a coupled torsion beam axle type rear suspension system having a transverse leaf spring.

Description of the Related Art

In general, a vehicle suspension is a device that connects an axle to a body of a vehicle and prevents direct transmission of vibration or shock from the road surface to the body while the vehicle is traveling, thereby preventing damage to the body or cargo therein and providing better ride comfort. The vehicle suspension is generally classified into a front suspension and a rear suspension.

Light cars and semi-compact cars sometimes use a coupled torsion beam axle type rear suspension, which exhibits relatively high driving stability with a low unit cost and mass.

A conventional coupled torsion beam axle type rear suspension includes a coupled torsion beam axle having a cross-section opened downward (reverse U-shaped or V-shaped cross-section) and disposed in a transverse direction of a vehicle body, a pair of trailing arms coupled to respective ends of the coupled torsion beam axle in a longitudinal direction of the vehicle body, and a spindle bracket coupled to the outside of the rear end of each of the trailing arms and to which a rear wheel is coupled, The conventional coupled torsion beam axle type rear suspension further includes a lower spring seat coupled to the inside of the rear end of the trailing arm, a coil spring installed on and having a lower end supported on the lower spring seat, and an upper spring seat coupled to a body member and on which the upper end of the coil spring is supported.

As described above, the conventional coupled torsion beam axle type rear suspension includes the coil spring installed vertically to absorb shock and vibration. However, the layout for installation of the coil spring results in a narrowing of the interior space of the vehicle in transverse and vertical directions. In particular, the conventional rear suspension has to include upper and lower spring seats and spring pads together for installation of the coil spring, which causes an increase in the number of parts and an increase in production cost.

In addition, the conventional rear suspension has a structure in which, when a lateral force is applied thereto, the lateral force is supported only by the coupled torsion beam axle, which is disadvantageous in lateral stiffness and safety, and in particular, in driving stability due to the occurrence of excessive toe-out.

Moreover, in order to effectively respond to the rolling behavior of the vehicle during driving, it is desired to provide sufficient roll stiffness. To this end, the conventional rear suspension requires an increased cross-sectional thickness of the coupled torsion beam axle, which leads to a deterioration in durability of welds between the coupled torsion beam axle and the trailing arms.

The foregoing is intended merely to aid in the understanding of the background of the present disclosure, and is not intended to mean that the present disclosure falls within the purview of the related art that is already known to those having ordinary skilled in the art.

SUMMARY

The present disclosure proposes a coupled torsion beam axle type rear suspension system having a transverse leaf spring connecting left and right trailing arms instead of coil springs connecting trailing arms to body members. Accordingly, it is possible to increase a vehicle interior space in transverse and vertical directions by virtue of using no coil spring, and in particular, to reduce the number of parts and production cost by virtue of using no spring seat and spring pad.

In addition, the present disclosure proposes a coupled torsion beam axle type rear suspension system having a structure in which, when a lateral force is applied thereto, the lateral force is distributed and supported by a coupled torsion beam axle and a transverse leaf spring. Accordingly, it is possible to improve safety by increasing lateral stiffness, and in particular, to improve driving stability by reducing toe-out.

Furthermore, as another embodiment, the present disclosure proposes a coupled torsion beam axle type rear suspension system having a structure in which a transverse leaf spring functions as a stabilizer bar that increases roll stiffness of a vehicle with respect to rolling behavior of the vehicle, thereby reducing the rolling behavior of the vehicle so as to effectively respond to rolling behavior. This configuration makes it possible to reduce a cross-sectional thickness of a coupled torsion beam axle. Accordingly, it is possible to improve durability of welds between the coupled torsion beam axle and trailing arms. Further, the present disclosure is also applicable to coupled torsion beam axles of heavy-duty vehicles.

In accordance with an aspect of the present disclosure, there is provided a coupled torsion beam axle type rear suspension system that includes a coupled torsion beam axle installed to extend in a transverse direction of a vehicle body, a pair of trailing arms coupled to respective ends of the coupled torsion beam axle and installed to extend longitudinally, and a transverse leaf spring extending transversely and having both ends connected to the respective trailing arms.

The transverse leaf spring may be positioned behind the coupled torsion beam axle.

Both ends of the transverse leaf spring may be fixedly installed to either bottoms or tops of rear ends of the trailing arms through side bushes, respectively.

The side bushes may be elastically deformed while each absorbing vertical and transverse displacements along a rotational trajectory of an associated rear wheel during bumps and rebounds.

The transverse leaf spring may have a center portion fixedly installed to a body cross member through a center bush.

The center bush may be elastically deformed while absorbing a vertical displacement during vertical behavior of the transverse leaf spring.

The trailing arms may have front ends coupled to body side members, respectively. The body cross member may be positioned above the transverse leaf spring and have both ends coupled to the body side members.

The coupled torsion beam axle type rear suspension system may further include spindle brackets coupled to the outsides of rear ends of the trailing arms, respectively, the spindle brackets being coupled to respective rear wheels.

In accordance with another aspect of the present disclosure, there is provided a coupled torsion beam axle type rear suspension system that includes a transverse leaf spring positioned between a pair of trailing arms and extending in the same direction as a coupled torsion beam axle, the transverse leaf spring having both ends coupled to the trailing arms.

The transverse leaf spring may be a leaf spring having a predetermined cross-sectional thickness and be installed to extend from side to side.

The transverse leaf spring may be positioned behind the coupled torsion beam axle and have both ends extending from side to side and coupled to rear ends of the respective trailing arms.

Side bushes may be respectively fixed to the tops of both ends of the transverse leaf spring. The side bushes may be in contact with the bottoms of rear ends of the respective trailing arms. Both ends of the transverse leaf spring may be coupled to the trailing arms through the side bushes, respectively, by bolts fastened to the trailing arms after passing through the transverse leaf spring and the side bushes in a direction from bottom to top of the transverse leaf spring.

Each of the side bushes may be elastically deformed when an external force is applied thereto so as to absorb vertical and transverse displacements along a rotational trajectory of an associated rear wheel.

The transverse leaf spring may be positioned beneath a body cross member and extends in the same direction as the body cross member. The transverse leaf spring may have a center portion connected to the body cross member.

The center portion of the transverse leaf spring may be bent to protrude toward the body cross member to narrow a gap from the body cross member.

In another embodiment, at least one center bush may be fixed to the top of the center portion of the transverse leaf spring. The at least one center bush may be in contact with the bottom of the body cross member. The center portion of the transverse leaf spring may be coupled to the body cross member through the at least one center bush by a bolt fastened to the body cross member after passing through the center portion of the transverse leaf spring and the at least one center bush in a direction from bottom to top of the transverse leaf spring.

The at least one center bush may include two center bushes spaced apart transversely from the center portion of the transverse leaf spring.

Each of the two center bushes may be elastically deformed so as to absorb a vertical displacement of the transverse leaf spring.

The trailing arms may have front ends coupled to body side members, respectively. The body cross member may be positioned above the transverse leaf spring and have both ends coupled to the body side members.

The coupled torsion beam axle type rear suspension system may further include spindle brackets coupled to the outsides of rear ends of the trailing arms, respectively, the spindle brackets being coupled to respective rear wheels.

As described above, the coupled torsion beam axle type rear suspension system according to the present disclosure includes the transverse leaf spring having both ends connected to the left and right trailing arms and the center portion connected to the body cross member. Therefore, it is possible to increase the vehicle interior space in the transverse and vertical directions by virtue of using no coil spring, and in particular, to reduce the number of parts and production cost by virtue of using no spring seat and spring pad.

In addition, the coupled torsion beam axle type rear suspension system has a structure in which, when a lateral force is applied thereto, the lateral force is distributed and supported by the coupled torsion beam axle and the transverse leaf spring. Therefore, it is possible to improve safety by increasing lateral stiffness, and in particular, to improve driving stability by reducing toe-out.

Furthermore, the coupled torsion beam axle type rear suspension system has a structure in which the transverse leaf spring functions as a stabilizer bar that increases the roll stiffness of the vehicle with respect to the rolling behavior of the vehicle, thereby reducing the rolling behavior of the vehicle so as to effectively respond to rolling behavior, which makes it possible to reduce the cross-sectional thickness of the coupled torsion beam axle. Therefore, it is possible to improve durability of welds between the coupled torsion beam axle and the trailing arms. Further, the present disclosure is also applicable to coupled torsion beam axles of heavy-duty vehicles.

BRIEF DESCRIPTION OF THE DRAWINGS

The above and other objects, features and advantages of the present disclosure should be more clearly understood from the following detailed description taken in conjunction with the accompanying drawings, in which:

FIGS. 6 to 9 are views for explaining a conventional coupled torsion beam axle type rear suspension system.

Figure 1:
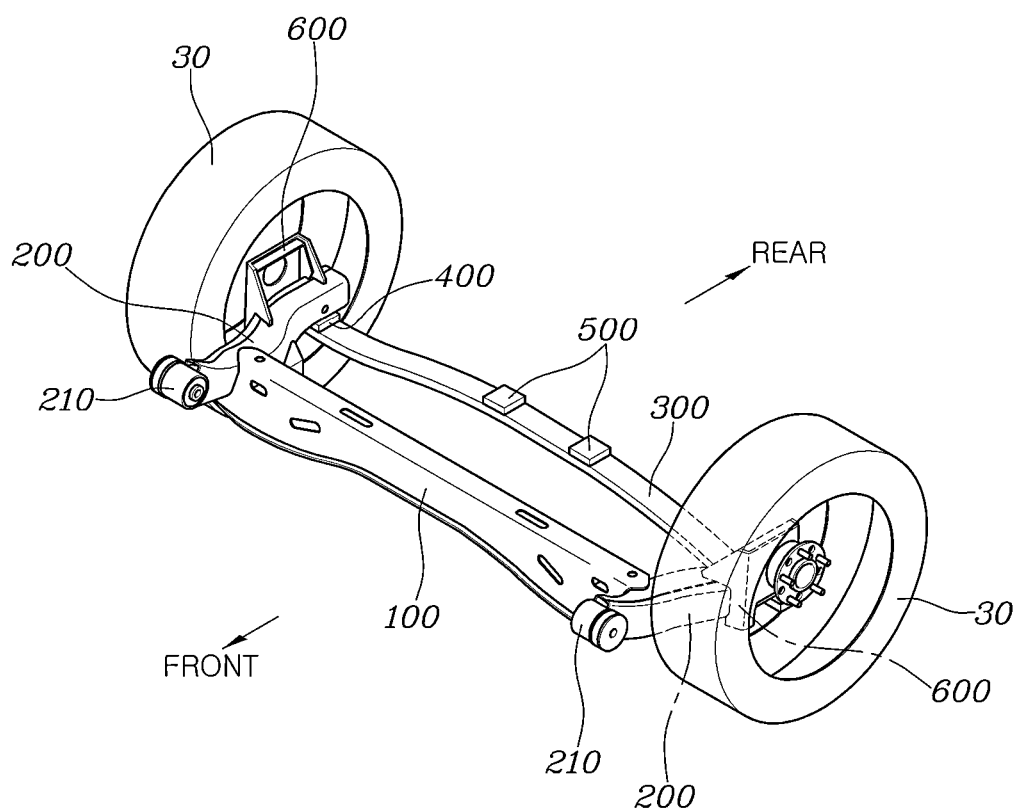
FIGS. 1 and 2 are perspective views illustrating a coupled torsion beam axle type rear suspension system according to one embodiment of the present disclosure.

The drawings described herein are for illustration purposes only and are not intended to limit the scope of the present disclosure in any way.

DESCRIPTION

The specific structural and functional descriptions disclosed in the specification or application are merely illustrated for the purpose of describing embodiments of the present disclosure. The present disclosure may be embodied in different forms, and should not be construed as being limited to the embodiments set forth herein.

The present disclosure may be subjected to various modifications and may have various forms, and specific embodiments are illustrated in the drawings and described in detail herein. However, this is not intended to limit the present disclosure to a specific embodiment. It should be understood that the present disclosure includes all modifications, equivalents or replacements that fall within the spirit and technical scope thereof.

Terms such as "first" and/or "second" may be used herein to describe various elements of the present disclosure, but these elements should not be construed as being limited by the terms. Such terms are used only for the purpose of differentiating one element from other elements of the present disclosure. For example, without departing from the scope and spirit of the present disclosure, a first element may be referred to as a second element, and, similarly, a second element may also be referred to as a first element.

It will be understood that when an element is referred to as being "coupled" or "connected" to another element, it can be directly coupled or connected to the other element or intervening elements may also be present. On the other hand, it will be understood that when an element is referred to as being "directly coupled" or "directly connected" to another element, there are no intervening elements present. Other expressions for describing relationships between elements, for example, "between" and "immediately between" or "neighboring" and "directly neighboring" may also be interpreted likewise.

When a component, device, element, or the like of the present disclosure is described as having a purpose or performing an operation, function, or the like, the component, device, or element should be considered herein as being "configured to" meet that purpose or to perform that operation or function.

The terminology used herein is for the purpose of describing particular embodiments only and is not intended to limit the present disclosure. As used herein, the singular forms "a", "an" and "the" are intended to include the plural forms as well, unless context clearly indicates otherwise. It will be further understood that the terms "comprises"/"includes" and/or "comprising"/"including" when used in the specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms, including technical and scientific terms, used herein have the same meaning as those commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The control unit (controller) according to the exemplary embodiment of the present disclosure may be implemented through a processor (not shown) configured to perform the operation described below using an algorithm configured to control the operation of various components of the vehicle or a nonvolatile memory (not shown) configured to store data relating to software instructions for reproducing the algorithm and data stored in that memory. Here, the memory and the processor may be implemented as separate chips. Alternatively, the memory and the processor may be implemented as a single chip integrated with each other. The processor may take the form of one or more processors.

Hereinafter, a coupled torsion beam axle type rear suspension system according to an exemplary embodiment of the present disclosure is described with reference to the accompanying drawings.

Figure 2:
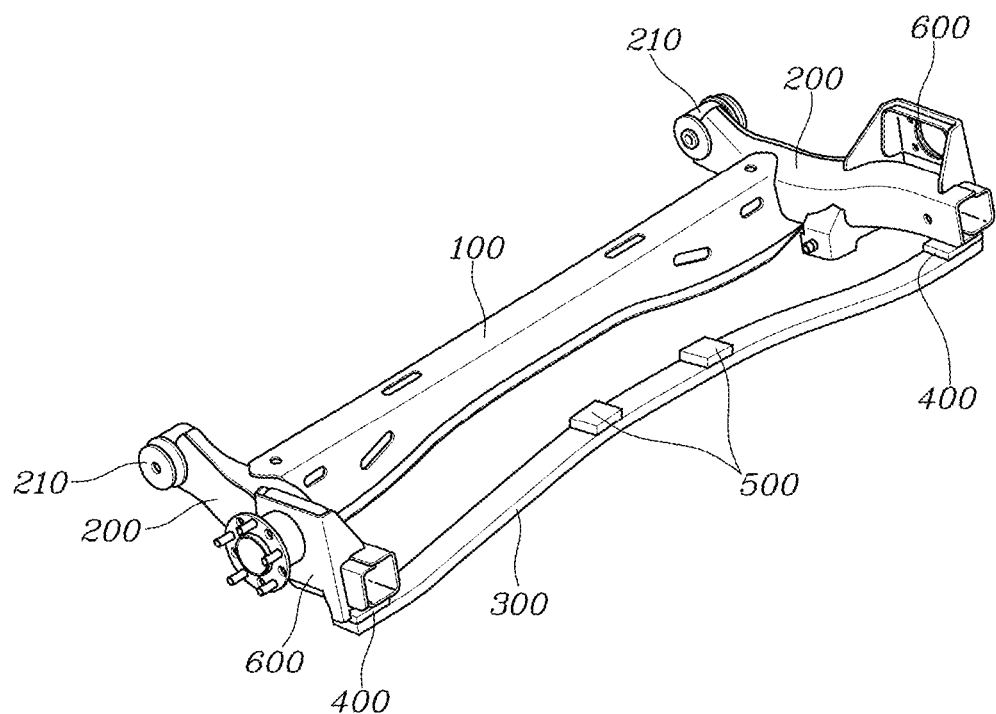
Figure 3:
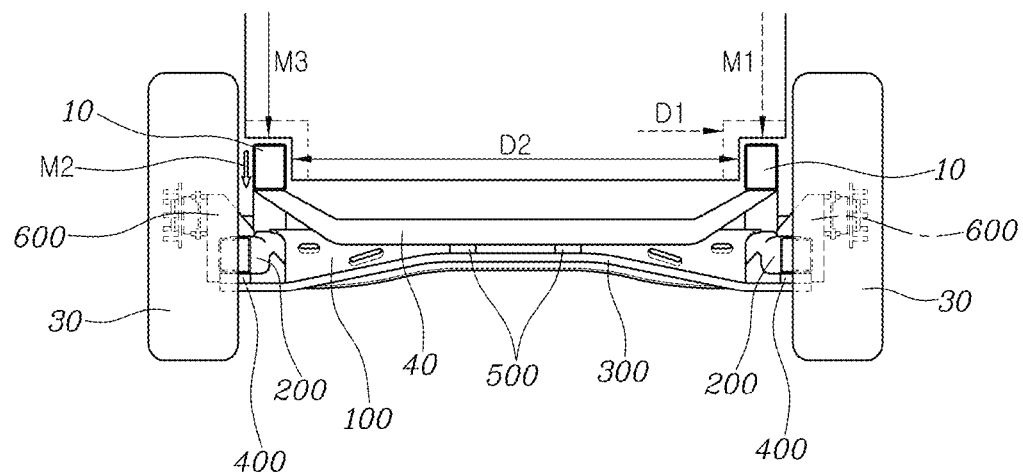
FIG. 3 is a view of FIG. 1 when viewed from the rear.
Figure 4:
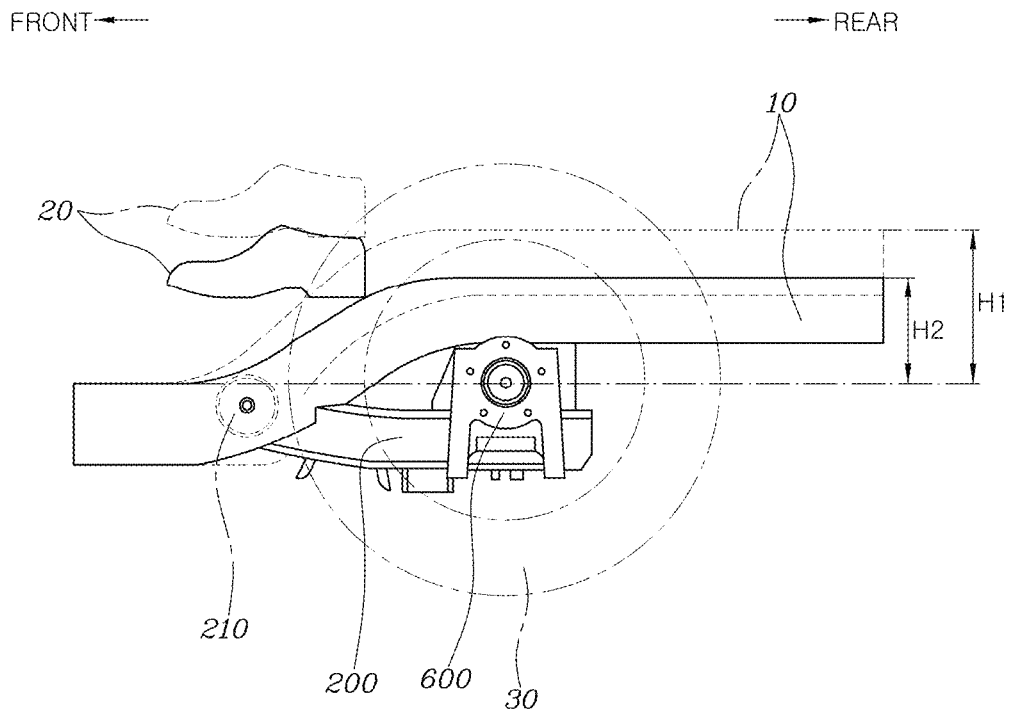
FIG. 4 is a side view illustrating the coupled torsion beam axle type rear suspension system according to one embodiment of the present disclosure.
Figure 5:
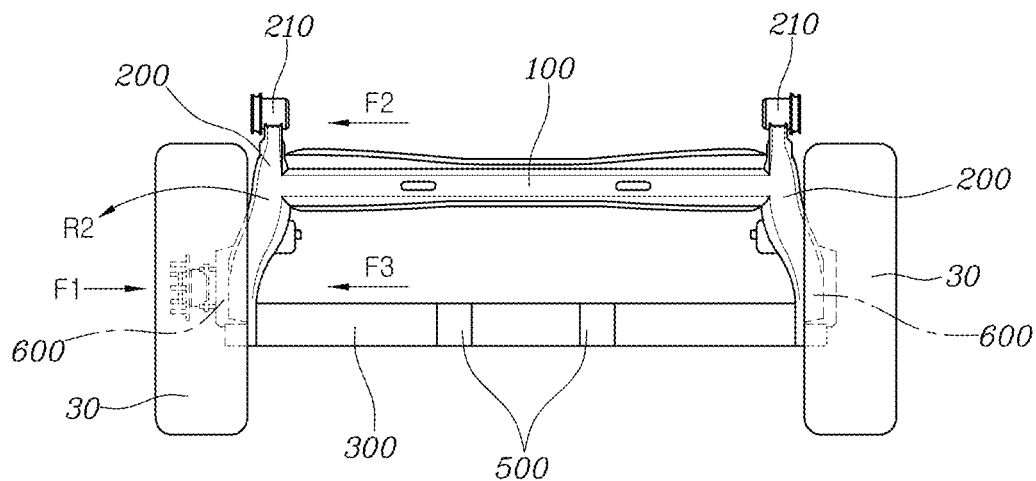
FIG. 5 is a top view of FIG. 1.

In one embodiment of the present disclosure, the coupled torsion beam axle type rear suspension system includes, as illustrated in FIGS. 1 to 5, a coupled torsion beam axle 100 which extends in a transverse direction (e.g., a width direction) of a vehicle body, and a pair of trailing arms 200 which extends in a longitudinal direction (e.g., a front-rear direction) of the vehicle body and is coupled to respective ends of the coupled torsion beam axle 100. The longitudinal direction means a direction perpendicular to the transverse direction of the vehicle body. The coupled torsion beam axle type rear suspension system further includes a transverse leaf spring 300 extending in the transverse direction and having both ends connected to the respective trailing arms 200.

The coupled torsion beam axle 100 has a cross-section opened downward (reverse U-shaped or V-shaped cross-section) and is disposed in the transverse direction of the vehicle body.

Each of the trailing arms 200 has a trailing arm bush 210 coupled to the front end thereof, and the trailing arm bush 210 is coupled to a body side member 10 extending longitudinally on each of left and right sides of the vehicle body.

The transverse leaf spring 300 is a leaf spring having a predetermined cross-sectional thickness and has a straight shape extending from side to side. Both ends of the transverse leaf spring 300 are connected to the respective trailing arms 200.

The transverse leaf spring 300 is positioned behind the coupled torsion beam axle 100 in consideration of the layout of the installation space thereof.

As illustrated in FIGS. 6 to 9, a conventional coupled torsion beam axle type rear suspension includes a pair of coil springs 1 each installed vertically.

For installation of each of the coil springs 1, a lower spring seat 2 is coupled to the inside of the rear end of each trailing arm 200, the coil spring 1 has a lower end installed to the lower spring seat 2 through a spring pad, the coil spring 1 has an upper end supported on an upper spring seat 3 through a spring pad, and the upper spring seat 3 is coupled to a body side member 10 extending longitudinally on each of left and right sides of a vehicle body.

The coil springs 1 of the conventional rear suspension are configured to absorb shock and vibration. On the other hand, in the embodiment of the present disclosure, the transverse leaf spring 300 is used to reduce shock and vibration, instead of the coil springs 1.

The conventional rear suspension is configured to require the lower spring seat 2, the upper spring seat 3, and the spring pads for installation of each coil spring 1. However, according to the embodiment of the present disclosure, the rear suspension system is configured, for installation of the transverse leaf spring 300, to require no upper and lower spring seats and no spring pad unlike the prior art, which makes it possible to reduce the number of parts and thus to reduce the production cost and weight thereof.

In the structure of the conventional rear suspension, each coil spring 1, especially the upper spring seat 3, increases the amount of kick-up (step height) H1 of the body side member 10, which increases the position of the seated occupant's foot 20, making riding uncomfortable. In addition, this causes a reduction in transverse width D1 and vertical space M1 in the interior of the vehicle.

However, according to the embodiment of the present disclosure, the rear suspension system does not require such an upper spring seat unlike the prior art by virtue of the transverse leaf springs 300. This enables the amount of kick-up (step height) H2 of the body side member 10 to decrease compared to the conventional structure, which lowers the position of the seated occupant's foot 20, resulting in an improvement in ride comfort. In particular, it is possible to accomplish an increase in transverse width D2 and vertical space M3 in the interior of the vehicle.

The present disclosure can effectively respond to autonomous vehicles and purpose built vehicles (PBVs) through low cost and the increase in transverse width and vertical space in the interior of the vehicle.

In addition, the conventional coupled torsion beam axle type rear suspension has a structure F2 in which, when a lateral force F1 is applied thereto, the lateral force is supported only by a coupled torsion beam axle 100, which is disadvantageous in lateral stiffness and safety, and in particular, in driving stability due to the occurrence of excessive toe-out R1.

In contrast, the coupled torsion beam axle type rear suspension system according to the embodiment of the present disclosure has a structure F2 and F3 in which, when a lateral force F1 is applied thereto, the lateral force is distributed and supported by the coupled torsion beam axle 100 and the transverse leaf spring 300. Therefore, it is possible to improve safety by increasing lateral stiffness, and in particular, to improve driving stability by reducing toe-out R2.

In addition, the conventional coupled torsion beam axle type rear suspension requires an increased cross-sectional thickness of the coupled torsion beam axle 100 to ensure roll stiffness, which leads to a deterioration in durability of welds between the coupled torsion beam axle 100 and trailing arms 200.

However, the coupled torsion beam axle type rear suspension system according to the embodiment of the present disclosure has a structure in which the transverse leaf spring 300 functions as a stabilizer bar that increases the roll stiffness of the vehicle with respect to the rolling behavior of the vehicle, thereby reducing the rolling behavior of the vehicle so as to effectively respond to rolling behavior, which makes it possible to reduce the cross-sectional thickness of the coupled torsion beam axle 100. Therefore, it is possible to improve durability of welds between the coupled torsion beam axle 100 and the trailing arms 200. Further, the present disclosure is also applicable to coupled torsion beam axles of heavy-duty vehicles.

According to one embodiment of the present disclosure, both ends of the transverse leaf spring 300 are fixedly installed to either the bottoms or the tops of the rear ends of the trailing arms 200 through side bushes 400, respectively.

The side bushes 400 may be elastically deformed while each absorbing vertical and transverse displacements along the rotational trajectory of an associated rear wheel 30 during bumps and rebounds.

According to one embodiment of the present disclosure, the transverse leaf spring 300 has a center portion fixedly installed to a body cross member 40 through a center bush 500.

The transverse leaf spring 300 is positioned beneath the body cross member 40 and extends in the same direction as the body cross member 40.

The center portion of the transverse leaf spring 300 is bent to protrude toward the body cross member 40 to narrow a gap from the body cross member 40, which allows the center portion of the transverse leaf spring 300 to be more easily coupled to the body cross member 40 through the center bush 500.

The center bush 500 may be elastically deformed while absorbing a vertical displacement during vertical behavior of the transverse leaf spring 300.

The center bush 500 may include two center bushes (first and second center bushes) spaced apart transversely from the center portion of the transverse leaf spring 300, which makes it possible to absorb the vertical displacement of the transverse leaf spring 300 with more ease.

Both the side bushes 400 and the center bushes 500 may be fixedly installed by bolting or using separate brackets.

In other words, a bolt may be fixedly fastened to each trailing arm 200 after passing through the transverse leaf spring 300 and the associated side bush 400, and a bolt may be fixedly fastened to the body cross member 40 after passing through the transverse leaf spring 300 and each center bush 500.

Alternatively, separate brackets may be fixed to the trailing arm 200 and the body cross member 40 while surrounding the side bush 400 and the center bush 500, respectively, to finally fasten bolts through the brackets and the bushes.

The trailing arm bushes 210 are coupled to the front ends of the trailing arms 200 and are coupled to the body side members 10, respectively. The body cross member 40 is positioned above the transverse leaf spring 300 and has both ends coupled to the body side members 10.

In the embodiment of the present disclosure, spindle brackets 600 are coupled to the outsides of the rear ends of the trailing arms 200, respectively. Each of the spindle brackets 600 is coupled to the associated rear wheel 30.

As described above, the coupled torsion beam axle type rear suspension system according to the present disclosure includes the transverse leaf spring 300 having both ends connected to the left and right trailing arms 200 and the center portion connected to the body cross member 40. Therefore, it is possible to increase the vehicle interior space in the transverse and vertical directions by virtue of using no coil spring, and in particular, to reduce the number of parts and production cost by virtue of using no spring seat and spring pad.

In addition, the coupled torsion beam axle type rear suspension system has a structure in which, when a lateral force is applied thereto, the lateral force is distributed and supported by the coupled torsion beam axle 100 and the transverse leaf spring 300. Therefore, it is possible to improve safety by increasing lateral stiffness, and in particular, to improve driving stability by reducing toe-out.

Furthermore, the coupled torsion beam axle type rear suspension system has a structure in which the transverse leaf spring 300 functions as a stabilizer bar that increases the roll stiffness of the vehicle with respect to the rolling behavior of the vehicle, thereby reducing the rolling behavior of the vehicle so as to effectively respond to rolling behavior, which makes it possible to reduce the cross-sectional thickness of the coupled torsion beam axle 100. Therefore, it is possible to improve durability of welds between the coupled torsion beam axle 100 and the trailing arms 200. Further, the present disclosure is also applicable to coupled torsion beam axles of heavy-duty vehicles.

Although specific embodiments of the present disclosure have been disclosed for illustrative purposes, those having ordinary skilled in the art will appreciate that various modifications, additions and substitutions are possible, without departing from the scope and spirit of the present disclosure.

What is claimed is:

1. A coupled torsion beam axle rear suspension system comprising:
   a transverse leaf spring positioned between a pair of trailing arms and extending in the same direction as a coupled torsion beam axle, the transverse leaf spring including both ends coupled to the trailing arms,
   wherein:
   side bushes are respectively fixed to tops of both ends of the transverse leaf spring;

the side bushes are in contact with bottoms of rear ends of the respective trailing arms; and both ends of the transverse leaf spring are coupled to the trailing arms through the side bushes, respectively, by bolts fastened to the trailing arms after passing through the transverse leaf spring and the side bushes in a direction from bottom to top of the transverse leaf spring.

2. The coupled torsion beam axle rear suspension system according to claim 1, wherein the transverse leaf spring is a leaf spring having a predetermined cross-sectional thickness and is installed to extend from side to side.

3. The coupled torsion beam axle rear suspension system according to claim 1, wherein the transverse leaf spring is positioned behind the coupled torsion beam axle, and both ends of the transverse leaf spring are configured to extend from side to side and coupled to rear ends of the respective trailing arms.

4. The coupled torsion beam axle rear suspension system according to claim 1, wherein each of the side bushes is elastically deformed when an external force is applied thereto so as to absorb vertical and transverse displacements along a rotational trajectory of an associated rear wheel.

5. The coupled torsion beam axle rear suspension system according to claim 1, wherein:

the transverse leaf spring is positioned beneath a body cross member and extends in the same direction as the body cross member; and the transverse leaf spring has a center portion connected to the body cross member.

6. The coupled torsion beam axle rear suspension system according to claim 5, wherein the center portion of the transverse leaf spring is bent to protrude toward the body cross member to narrow a gap from the body cross member.

7. The coupled torsion beam axle rear suspension system according to claim 5, further comprising:

at least one center bush fixed to a top of the center portion of the transverse leaf spring, wherein the at least one center bush is in contact with a bottom of the body cross member, and wherein the center portion of the transverse leaf spring is coupled to the body cross member through the at least one center bush by a bolt fastened to the body cross member after passing through the center portion of the transverse leaf spring and the at least one center bush in a direction from bottom to top of the transverse leaf spring.

8. The coupled torsion beam axle rear suspension system according to claim 7, wherein the at least one center bush includes first and second center bushes which are spaced apart transversely from the center portion of the transverse leaf spring.

9. The coupled torsion beam axle rear suspension system according to claim 8, wherein each of the first and second center bushes is configured to elastically deformed and to absorb a vertical displacement of the transverse leaf spring.

10. The coupled torsion beam axle rear suspension system according to claim 5, wherein:

the trailing arms have front ends coupled to body side members, respectively; and the body cross member is positioned above the transverse leaf spring and includes both ends coupled to the body side members.

11. The coupled torsion beam axle rear suspension system according to claim 1, further comprising:

spindle brackets coupled to outsides of rear ends of the trailing arms, respectively, the spindle brackets being coupled to respective rear wheels.

* * * * *